US009727568B2

(12) United States Patent
Eriksson et al.

(10) Patent No.: US 9,727,568 B2
(45) Date of Patent: Aug. 8, 2017

(54) METHOD AND SYSTEM FOR GAME DATA COLLECTION

(71) Applicant: KING.COM LIMITED, St. Julians (MT)

(72) Inventors: Mats-Olof Eriksson, London (GB); Lars Sjodin, Stockholm (SE)

(73) Assignee: KING.COM LTD., St. Julians (MT)

( * ) Notice: Subject to any disclaimer, the term of this patent is extended or adjusted under 35 U.S.C. 154(b) by 123 days.

(21) Appl. No.: 14/244,342

(22) Filed: Apr. 3, 2014

(65) Prior Publication Data

US 2014/0304295 A1  Oct. 9, 2014

(30) Foreign Application Priority Data

Apr. 3, 2013  (GB) .................... 1306037.1

(51) Int. Cl.
*G06F 17/30* (2006.01)
*G07F 17/32* (2006.01)
*A63F 13/40* (2014.01)

(52) U.S. Cl.
CPC ........ *G06F 17/30103* (2013.01); *A63F 13/10* (2013.01); *G07F 17/32* (2013.01); *G07F 17/3237* (2013.01)

(58) Field of Classification Search
CPC .... G06F 17/30103; A63F 13/10; G07F 17/32; G07F 17/3237
USPC ....................................................... 707/769
See application file for complete search history.

(56) References Cited

U.S. PATENT DOCUMENTS

| | | | |
|---|---|---|---|
| 2003/0114224 A1 | 6/2003 | Anttila et al. | |
| 2003/0177187 A1* | 9/2003 | Levine | A63F 13/10 709/205 |
| 2006/0247055 A1* | 11/2006 | O'Kelley | A63F 13/12 463/42 |
| 2006/0281541 A1* | 12/2006 | Nguyen | G07F 17/32 463/25 |
| 2006/0287099 A1* | 12/2006 | Shaw | A63F 13/12 463/42 |
| 2008/0096663 A1* | 4/2008 | Lieberman | A63F 13/10 463/42 |
| 2008/0274798 A1* | 11/2008 | Walker | G07F 17/32 463/25 |
| 2009/0298576 A1* | 12/2009 | Nguyen | G07F 17/32 463/25 |
| 2010/0113160 A1* | 5/2010 | Belz | A63F 13/12 463/42 |
| 2011/0136577 A1* | 6/2011 | Dietz | A63F 13/12 463/42 |
| 2011/0319169 A1* | 12/2011 | Lam | A63F 13/12 463/42 |

(Continued)

OTHER PUBLICATIONS

International Search Report, dated Jun. 4, 2014, and Written Opinion issued in International Application No. PCT/EP2014/056757.

*Primary Examiner* — Kris Mackes
*Assistant Examiner* — Tiffany Bui
(74) *Attorney, Agent, or Firm* — Saul Ewing LLP

(57) ABSTRACT

A method comprises receiving a call to a method in response to detection of a game event in a user device, responsive to said call, generating a data file, said data file comprising identity information associated with said game event and a value of at least one parameter; and storing said data file in a data store.

10 Claims, 4 Drawing Sheets

(56) References Cited

U.S. PATENT DOCUMENTS

| | | | |
|---|---|---|---|
| 2012/0165100 A1* | 6/2012 | Lalancette | A63F 13/10 709/248 |
| 2013/0045803 A1* | 2/2013 | Kang | G07F 17/3223 463/42 |
| 2015/0141154 A1* | 5/2015 | Yuan | A63F 13/10 463/43 |

* cited by examiner

METHOD AND SYSTEM FOR GAME DATA COLLECTION

CROSS-REFERENCE TO RELATED APPLICATIONS

This application is based on, and claims priority to, Great Britain Application No. GB 1306037.1, filed Apr. 3, 2013, the entire contents of which is fully incorporated herein by reference.

FIELD OF THE INVENTION

Some embodiments may relate to computer game data and other game or user associated data in an online environment. Some embodiments may relate to computer devices connected in a communications network with at least one database storing said data.

BACKGROUND OF THE INVENTION

Some computer implemented games may have a very large number of players, each having associated data such as identity (user-name), email, scores, time played, and other associated data which may be provided by the user, for example social network accounts and associated friends therein.

Game analytics is used to analyse data associated with games. The game analytic data can be used for a number of different purposes to understand user behaviour, enhanced games amongst other. Managing the very large quantity of data for data analytics is challenging.

SUMMARY OF THE INVENTION

According to an aspect, there is provided a method comprising: receiving a call to a method in response to detection of a game event in a user device; responsive to said call, generating a data file, said data file comprising identity information associated with said game event and a value of at least one parameter; and storing said data file in a data store.

The method may be called by a plurality of different games.

The call may comprise a value of at least one parameter in said data file.

The method may comprise providing at a server side a value of at least one parameter.

According to another aspect, there is provided a method comprising: using a first data store of a plurality of data file information to formulate a query, each said data file information comprising identity information associated with a game event, and one or more parameters to be stored with said identity information in a second data store; and querying said second data store with said query, said second data store comprising a plurality of data files, each data file having respective identity information and one or more respective values of said respective parameters and being generated in response to the occurrence of the associated game event.

The data file may comprise a text file.

According to another aspect there is provided a system comprising: apparatus configured to store and run a method, said apparatus configured to receive a call to said method in response to detection of a game event in a user device, said apparatus configured in response to said call, to generate a data file, said data file comprising identity information associated with said game event and a value of at least one parameter; and a data store configured to store said data file in a data store.

The method may be called by a plurality of different games.

The call may comprise a value of at least one parameter in said data file.

The system may add a value of at least one parameter.

According to another aspect, there is provided a system comprising: a first data store of a plurality of data file information, each said data file information comprising identity information associated with a game event, and one or more parameters to be stored with said identity information in a second data store; and said second data store, said second data store comprising a plurality of data files, each data file having respective identity information and one or more respective values of said respective parameters and being generated in response to the occurrence of the associated game event; and apparatus configured to formulate a query using said first data store and to querying said second data store with said query, The data file may comprise a text file.

A computer program product comprising program code means which when loaded into a processor controls the processor to perform the method may also be provided.

Various other aspects and further embodiments are also described in the following detailed description and in the attached claims.

BRIEF DESCRIPTION OF DRAWINGS

To understand some embodiments, reference will now be made by way of example only to the accompanying drawings, in which.

DETAILED DESCRIPTION OF THE INVENTION

The terms user and player are used interchangeably throughout this document and no specific meaning is intended using one or the other unless the context suggests otherwise. A person skilled in the art will realise that the different approaches to implementing the embodiments are not exhaustive, what is described herein are certain preferred embodiments. It is possible to implement the invention in a number of variations without departing from its spirit or scope.

Figure 1:
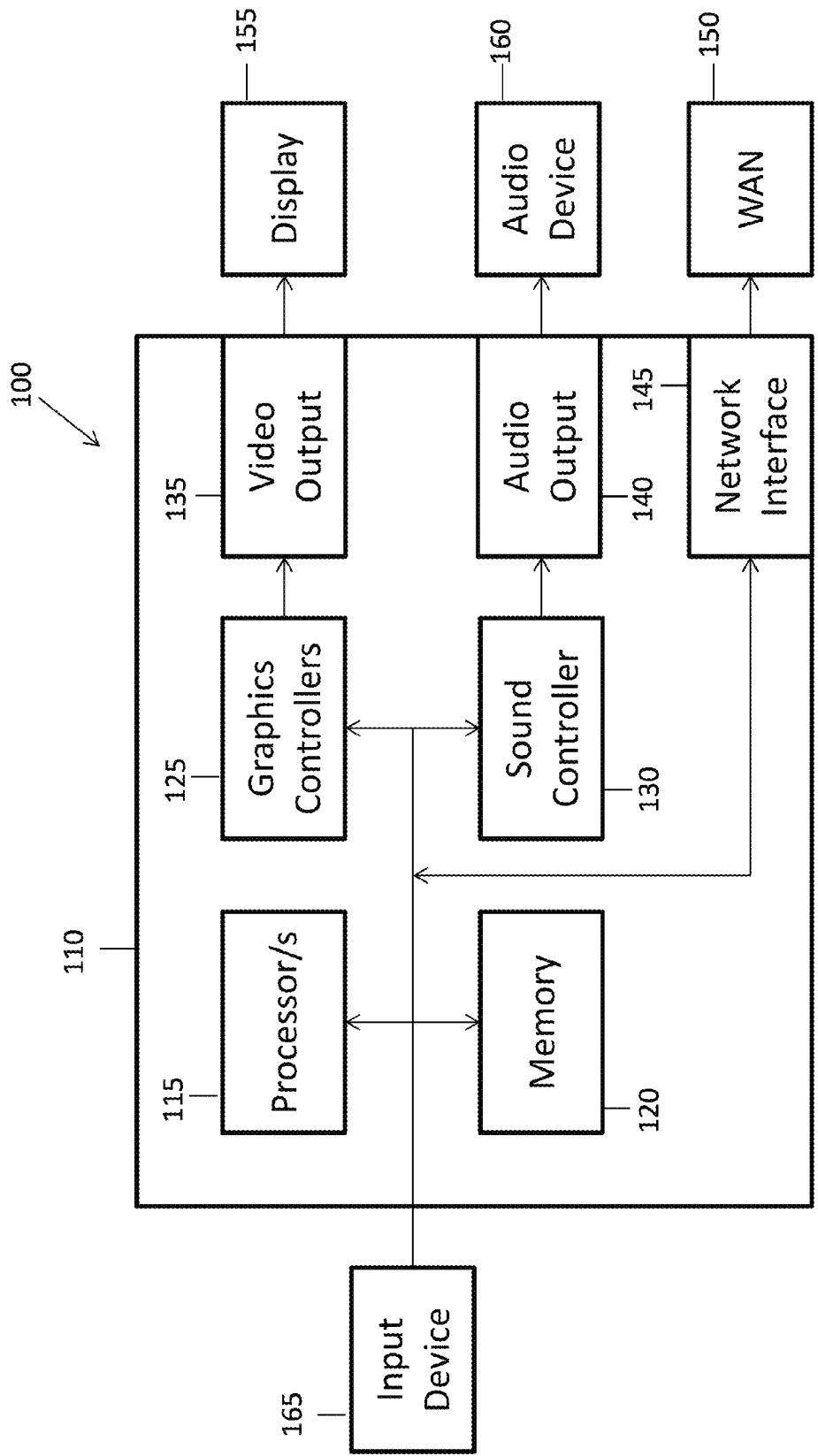
FIG. 1 shows an example computing device of an embodiment.

A schematic view of a user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
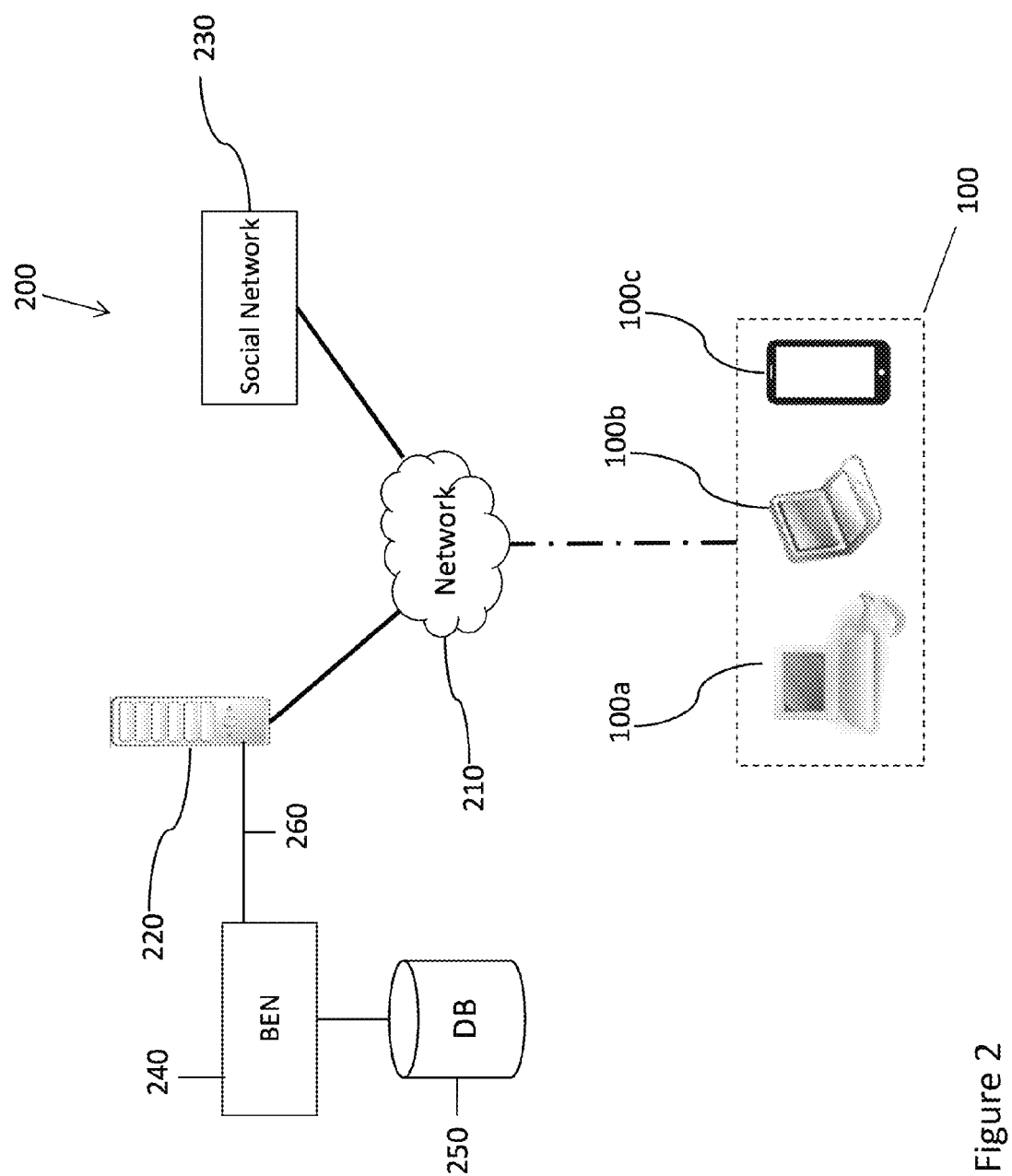
FIG. 2 illustrates an example system in which some embodiments may be provided.

FIG. 2 schematically shows a system 200 in some embodiments. The system 200 comprises a server 220 which may store or be in communication with databases 250 which may be, in some embodiments, connected to a back end infrastructure 240 "BEN") of game player's details, profiles, statistics, etc. In practice, one or more databases 250 may be provided. Where more than one server 220 is provided, the database(s) 250 may be provided in one database 250 or across two or more servers 220, 310. The server 220 may also have a games data function. This may comprise one or more units of memory to store the computer game program and user behaviour data, and a processor to run the games program and process the user behaviour data.

The server 220 may communicate via for instance the internet 210 to one or more user devices 100, shown in the figure by way of example as user devices 100a, 100b and 100c, and may further provide connections to a social network 230 such as facebook™.

Figure 3:
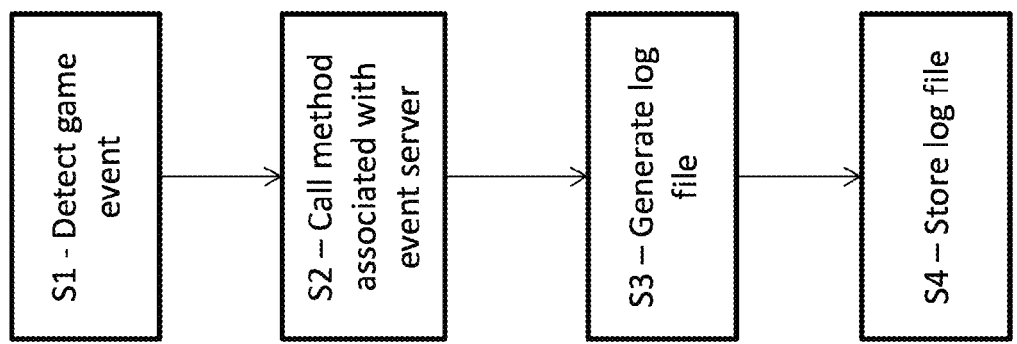
FIG. 3 shows a flowchart of a method according to an embodiment.

Reference is made to FIG. 3 which shows a method of an embodiment. In step S1, on a client device, a particular game event is detected. The game event can be any suitable game event and for example will be an end of game event. This may be detected or determined in the client device, by for example one or more of the processors 115.

In response to the detection of this game event, in step S2, a call will be made by the client device to a method associated with the end of game of event. The method is stored on the server side. A method can be regard as a code block that contains a series of statements. A program causes the statements to be executed by calling the method and specifying any required method arguments. When you call a method, you can pass information for it to use. These actual arguments are inside parentheses following the method name. Use commas to separate arguments if there is more than one This call may include one or more parameter values which may be associated with this event. One or more of the parameters associated with the game event may alternatively or additionally be separately provided to the game server.

In step S3, the call to the method associated with the end of game event will cause the server to generate a log file for that game event. The log file may be in any suitable format and in some embodiments is in the form of a text file. The log file will have a predetermined format, defined by the called method. The log file will include an end of game identifier (which may be a specific numeric value) as well as one or more parameter values. The one or more parameter values may be provided by the client device and/or by the server.

In step S4 the log file is then stored in a data store.

Figure 4:
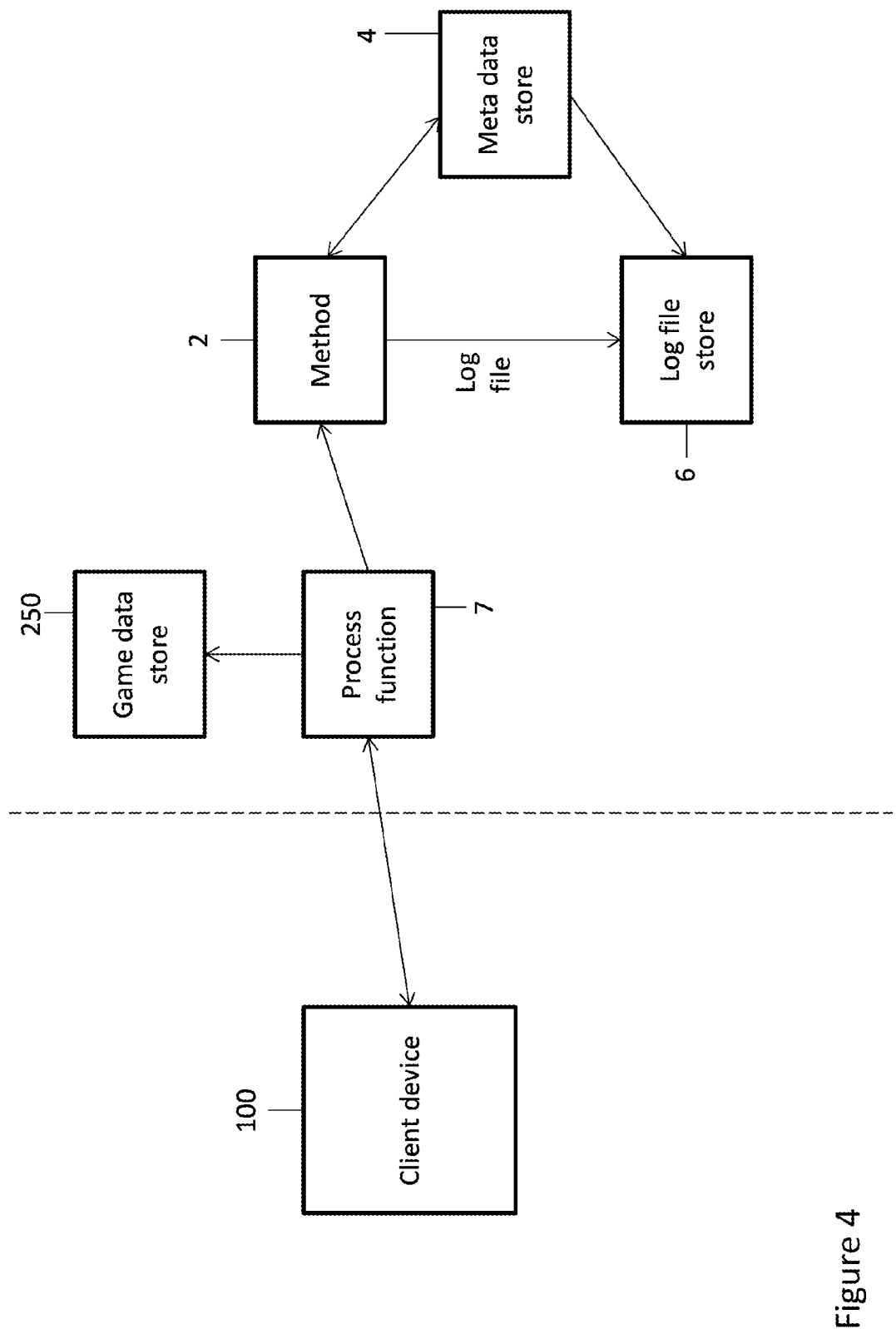
FIG. 4 schematically shows a system of an embodiment.

Reference is made to FIG. 4 which shows a system for performing the method of FIG. 3. It should be appreciated that FIG. 4 is schematic and shows some of the functions provided on the server side. The physical entities which provide these functions may be any one or more suitable entities. The client device 100 (which may be as discussed in relation to FIG. 1) will allow the user to play the game. The client device will determine when a particular game event occurs and cause the client device to make a call to the method 2 which is on the server side. A process function 7 which may be provided by a server or the like will receive the call. The call is then directed to the method 2 by the process function. The method 2 may be on the same server as the process function or a different server.to the process function. The server side also has the game data store 250 which stores a user's data, such as progress data or the like. Data for the game data store 250 may be received by the process function and directed to the game data store. In response to the invoking of the method 2, a log file is generated and in stored in a log file store 6. Any suitable data store 6 may be used to store the log file data 6, which may be the form of text files, as discussed above. Meta data will provide a key to the data stored in the log files in the log file store. This will define for each of the game event identifiers, the format of the information stored in the log file. A separate store 4 can be provided for this metadata. This meta data store 4 can be used to determine how to parse the stored log files and allows new queries to be formulated easily. Analytics for the data can be determined by using the information in the meta data store to form queries which can then be used to parse the data store which has the text data files.

It should be appreciated that the data in the log file may be provided by the client device. This data may be some of the data to be stored in the game data store and/or may be provided specifically for the log file. The server side may provide data such as for example time stamp information or the like.

The same method associated with the end of game event is used by one or more games. This means that all the log files associated with that same end of game method will have the same identifier so that analytics can be performed across more than one game. Like for like comparisons can be made for the same event across different games.

It should be appreciated that there may be a plurality of instances of the method which can be called. The methods will however be the same for the same associated game event, regardless of the game.

When writing a new game, a decision can be made as to what game events are to cause the generation of a log file. For each of those game events, a method stored on the server side will be invoked or called. The method which is stored on the server side will be the same regardless of the game. The game developer will therefore not need to write new code for the reporting associated with a particular game event. The game developer will make sure that the code generates the information, for example parameter values, for the method and that the particular game event will cause the client device to call the server. The game developer will need to ensure that the semantics used in the game match the semantics used in the game event method.

It should be appreciated that embodiments may be used with any suitable game event. The game event may be the completion of a level, the ending of a game, purchasing of a particular item, interaction with one or more friend, a particular score or the like.

An example of the information in a log file will now be described:

Event identity information (1000); user identity (1234); score (100); level (5) giving an entry of (1000, 1234, 100, 5).

The event identity may take any suitable form and may be a number. The number of parameters in a log file may be any suitable number, for example 2 or more. The parameters in a log file may be any suitable parameters such as parameters relating to the game, to the user, to the time, and actions taken by the user.

The event identity may be regarded as being a constant (for a particular event) that is used with the log file storage and in the meta data storage. This information may be used to analyze the data.

Some embodiments may use Java code. Based on the used code, files are generated that may be used to analyse this data.

The meta data store contains all the mappings from numbers that are in the files (data logs) that are to be analyzed. If you want to know what N as event identifier means, you can check in the meta data storage. That is, once again a Java code, so that once you use it as a developer you are going to use that Java code. Based on that Java code which is used, files may be generated which can be used in a business intelligence cluster or sometimes in the clients as well. So using Java as the original means what is actually used is what is going to be sent out. It is acting as a compiler, reading Java code.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A computer implemented method of managing game data for game data analytics comprising:

Receiving, at a server side device, a plurality of calls from respective user devices, each said call being to a computer implemented method for generating a respective data file, wherein said computer implemented method is called by a plurality of different computer implemented games, in response to detection of a respective game event in said computer implemented game in said respective user device, wherein at least one common game event is provided in said plurality of different computer implemented games;

responsive to each said call, generating said respective data file at said server side device, each data file comprising identity information associated with said respective game event and a value of at least one parameter relating to that respective game event, said identity information being the same for said respective common game event, which occurs in said respective plurality of different computer implemented games;

storing said data files in a data store; and based on said identity information and said at least one parameter stored in said data files, performing data analytics with respect to at least two different computer implemented games associated with one or more respective common game events provided in said respective plurality of different computer implemented games and having said common identity information.

2. The method as claimed in claim 1, wherein said call comprises a value of at least one parameter in said data file.

3. The method as claimed in claim 1, comprising providing at the or another server side device a value of at least one parameter.

4. A computer implemented method of managing game data for game data analytics comprising:

using a first data store of a plurality of data file information to formulate a query, each said data file information comprising identity information associated with a game event, and one or more parameters related to said game event, to be stored with said identity information in a second data store, wherein at least one common game event is provided in a plurality of different computer implemented games;

querying by at least one processor said second data store with said query, said second data store comprising a plurality of data files, each data file having respective identity information and one or more respective values of said respective parameters and being generated in response to an occurrence of an associated game event, said respective identity information being the same for said respective common game events, which occurs in said respective plurality of different computer implemented games; and using a result of said query to perform game data analytics with respect to at least two different computer implemented games associated with one or more respective common game events provided in said respective plurality of different computer implemented games and having said common identity information.

5. The method as claimed in claim 1, wherein said data file comprises a text file.

6. A system of managing game data for game data analytics comprising:
 a server side device configured to store and run a computer implemented method, said server side device configured to receive a plurality of calls to said computer implemented method, wherein said computer implemented method is called by a plurality of different computer implemented games, in response to detection of a game event in said computer implemented game in said respective user devices, wherein at least one common game event is provided in a plurality of different computer implemented games;
 said server side device configured in response to each said call, to generate a respective data file, each said data file comprising identity information associated with said respective game event and a value of at least one parameter relating to that respective game event, said identity information being the same for said respective common game event, which occur in said respective plurality of different computer implemented games;
 a data store configured to store said data files in a data store; and
 based on said identity information and said at least one parameter stored in said data files, a processor configured to perform data analytics with respect to at least two different computer implemented games associated with one or more respective game events provided in said respective plurality of different computer implemented games and having said common identity information.

7. The system as claimed in claim 6, wherein said call comprises a value of at least one parameter in said data file.

8. The system as claimed in claim 6, comprising adding by said system a value of at least one parameter.

9. A system of managing game data for game data analytics comprising:
 a first data store of a plurality of data file information, each said data file information comprising identity information associated with a game event, one or more parameters to be stored with said identity information in a second data store, wherein at least one common game event is provided in a plurality of different computer implemented games;
 said second data store comprising a plurality of data files, each data file having respective identity information and one or more respective values of said respective parameters and being generated in response to an occurrence of an associated game event, said respective identity information being the same for said respective common game events, which occur in said respective plurality of different computer implemented games;
 apparatus configured to formulate a query using said first data store and to querying said second data store with said query; and
 a processor configured to use a result of said query to perform game data analytics with respect to at least two computer implemented games associated with one or more respective common game events provided in said plurality of different computer implemented games and having said common identity information.

10. The system as claimed in claim 9, wherein said data file comprises a text file.

* * * * *